2 Sheets—Sheet 1.

D. J. O'HARRA & D. FEIT.
Ore-Feeder.

No. 224,946.      Patented Feb. 24, 1880.

WITNESSES            INVENTOR

D. J. O'HARRA & D. FEIT.
Ore-Feeder.

No. 224,946. Patented Feb. 24, 1880.

UNITED STATES PATENT OFFICE.

DAVID J. O'HARRA AND DANIEL FEIT, OF REDDING, CALIFORNIA.

ORE-FEEDER.

SPECIFICATION forming part of Letters Patent No. 224,946, dated February 24, 1880.

Application filed August 11, 1879.

*To all whom it may concern:*

Be it known that we, DAVID J. O'HARRA and DANIEL FEIT, of Redding, county of Shasta, and State of California, have invented an Improved Stamp-Battery Ore-Feeder; and we hereby declare the following to be a full, clear, and exact description thereof.

Our invention relates to certain improvements in stamp-battery ore-feeders; and our invention consists in a novel construction and arrangement of devices for operating and regulating the feed of the apron and keeping it at a proper tension.

Figure 1:
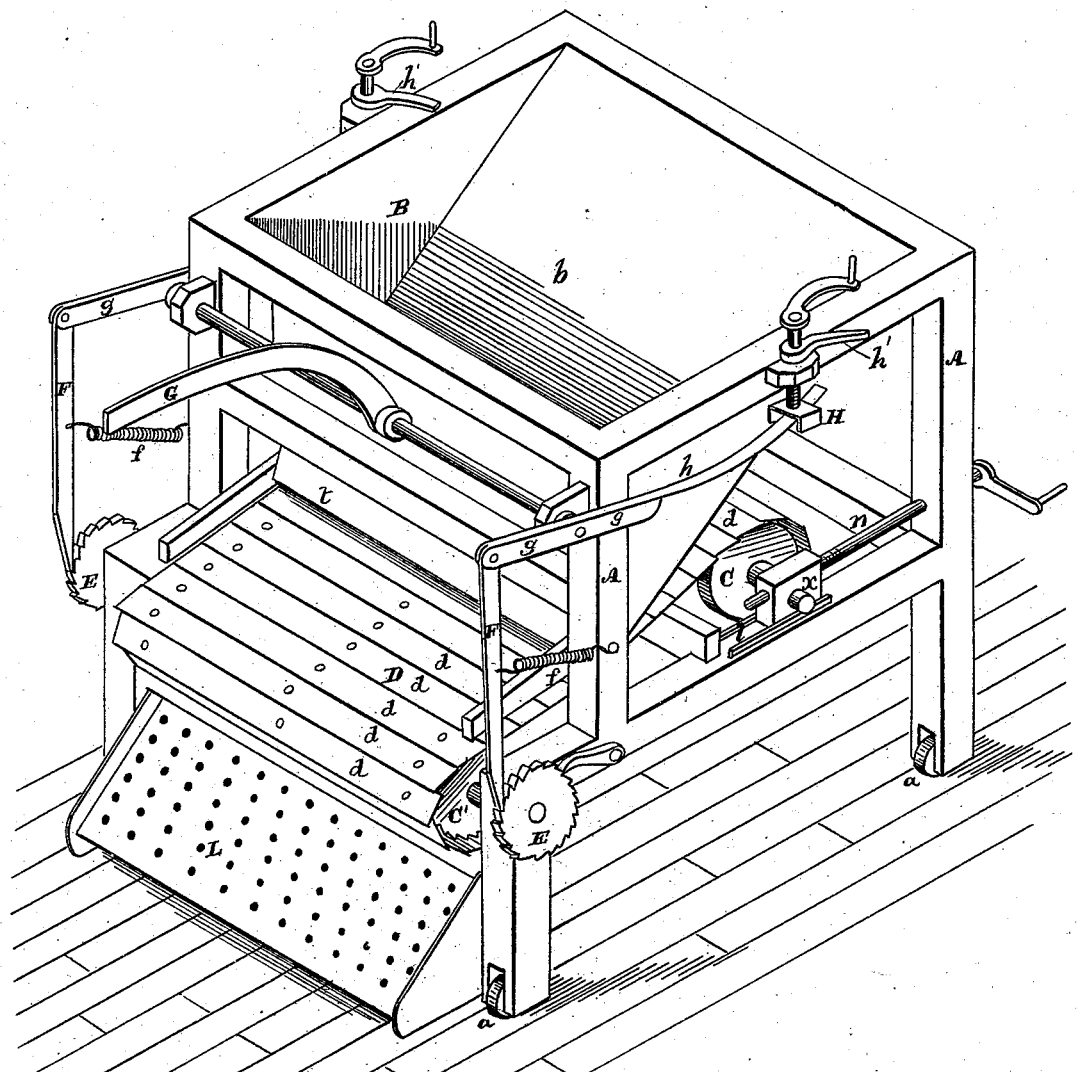
Figure 2:
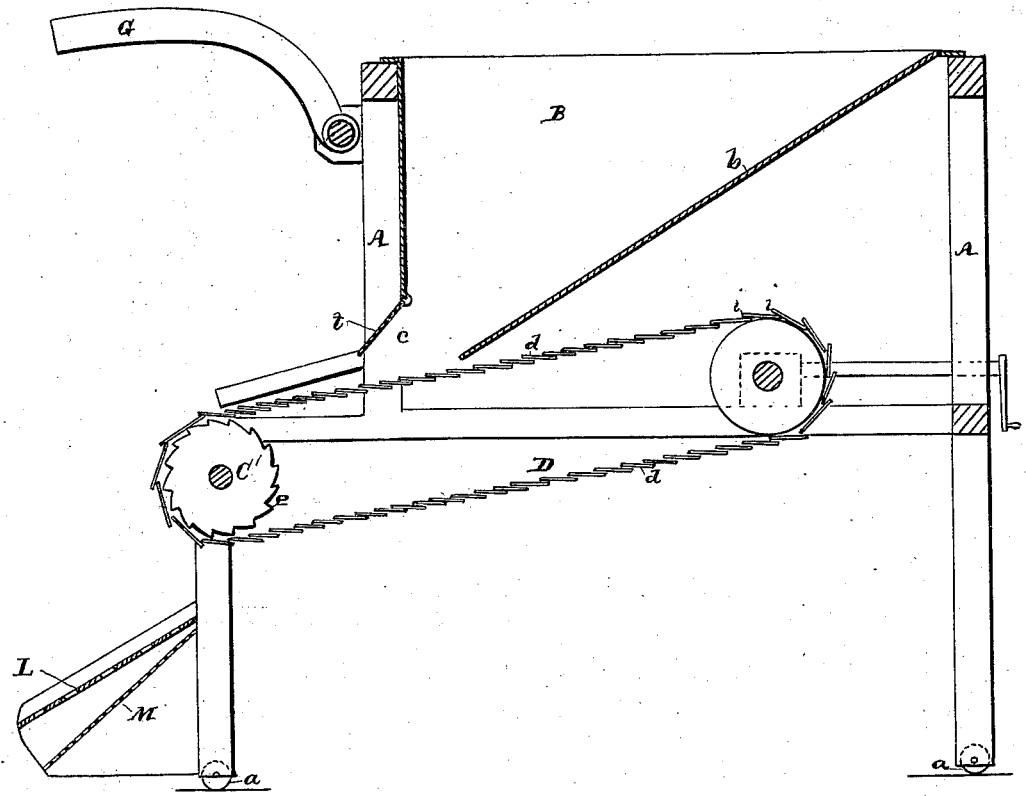

Figure 1 is a perspective view. Fig. 2 is a vertical section.

Let A represent the frame of the feeder, which is mounted on rollers $a$, so as to be moved back from the batteries when desired. In the upper part of this frame is placed a hopper, B, the front side of which is vertical and the rear portion, $b$, made with a considerable inclination toward the front lower opening, $c$, as shown. This inclination extends down almost to the front side, so that the opening is really on the front rather than at the bottom of the hopper, the weight of ore thus resting on the inclined back. On the upper edge of the front is hinged a regulating door or gate, $t$, which, by being opened or closed, will regulate the size of the opening in the hopper, and will also regulate the amount passing down to the sieve. This door or gate smooths off the top of the ore passing down the apron, and the depth of ore on said apron is accordingly regulated in accordance with the class of ore being crushed. Under this feed-hooper and back of the opening is mounted a roller, C, its shaft or ends journaled in sliding boxes $x$, and in front of the hopper, on the frame, is placed another roller, C', somewhat lower than the rear one, as shown. The front roller is fitted with cog or toothed wheels $e$, as shown, for the purpose hereinafter described. On these rollers is placed an endless iron apron, D, consisting of a number of flat bars or plates of iron, $d$, linked together so as to overlap each other slightly, as shown. This endless iron apron runs over the rollers C C', and is somewhat inclined from rear to front, passing under the opening $c$ of the hopper, so as to receive the ore which passes through said hopper.

The rollers C', on the front or battery end, are provided with ratchets E, which are moved by dogs or pawls F, attached to a lever, G, which is placed in such a position that the tappet of the center stamp of a five-stamp battery will strike or move the lever when the stamps need ore, thus causing the iron apron to move forward and deliver a supply of ore to the feed-opening of the battery. The dogs or pawls F are supplied with springs $f$ to keep them in contact with the ratchets.

The arm $g$ of the lever G is extended back, and has upon it a spring, $h$, the outer end of which fits in a screw-clamp, H, on the side of the frame. The object of this construction is to regulate the feed of the apron.

When the spring $h$ on the lever-arm is loose by the screw-clamp H being screwed up, the dog or pawl F will not be lifted up very high by said spring after the stamp-tappet leaves the lever, and on the next downward stroke of the stamp-stem the ratchet on the roller moving the belt is only slightly turned.

For a greater feed the screw-clamp is screwed down, so that the spring $h$ is compressed considerably. Then when the weight of the stamp is relieved from the lever G this spring will raise the lever so as to lift the dogs or pawls up higher, and they will pass more teeth of the ratchet, and turn said ratchet and the apron-carrying roller further at the next blow of the stamp.

The forward motion of the apron is thus arranged so that the feed of ore to the stamps may be regulated to a nicety. It is not necessary to stop the machinery in order to do this; but the screw-clamps being on top of the framework, where the ore is fed to the hopper, the attendant may at any time regulate the feed of ore to suit the requirements of any particular class of ore. The screw-clamps are provided with lock-nuts $h'$, by which they may be held at any desired point without danger of loosening by the jar from the blow of the stamp.

The ends of the shaft or rollers C are placed in the sliding boxes $x$, which boxes have a longitudinal motion in the guides $l$ on the frame. Screw-rods $n$, passing through the frame and provided with cranks, fit into these boxes, and by turning the cranks the boxes may be drawn back, thus tightening the rolling apron and preventing it from sagging down under the hopper-feed opening.

It is customary, in preparing the ore from the batteries, to pass it through a rock-breaker before putting it into the hopper of the self-feeder, in order to reduce the size of the pieces of ore mined to a proper size to pass through the battery-opening and under the stamps and relieve the battery of some of the work. In doing this there is necessarily a great deal of ore crushed fine enough not to need a second crushing; but still it is put through with the rest, all being poured into the feed-hopper. As it is a loss of both time and power to submit this ore a second time to a crushing process, we provide a means of separating it from the coarser ore before it comes to the batteries. In front of and below the rolling apron we place an inclined screen or perforated metal plate, L, and under this again a correspondingly-inclined finer screen, M, a space being left between the two, as shown. The ore falls from the iron apron onto the coarse screen, and all that is too coarse to pass through the interstices or perforations is directed into the mortar. A partial separation is thus perfected and the lower screen protected from injury. The smaller pieces fall through the perforated plate onto the lower screen, and that which is too coarse to go through it is directed to the mortar, while the finest portion passes through the screen to a receptacle underneath. This finer portion may then be placed in the amalgamating-pans without having to go through the battery at all, thus making considerable saving.

The construction of the hopper is such that most of the weight of the ore is on the inclined portion, and no undue weight is brought on the rolling apron. This apron feeds the full width of a five-stamp battery, distributing the ore equally under all the stamps. The ore does not therefore pile up around a center stamp and distribute itself slowly, so one stamp has more work to do than another. The spreading of the ore also admits of the addition of the screen between the feeder and battery.

The movement is so sensitive that the stamps only get as much ore as they can crush, and not enough is fed to choke them. This sensitive movement of the apron is also advantageous, inasmuch as no crushing capacity of the middle stamp is taken from it in operating the feeder. The hopper feeding the apron in front prevents any pressure of ore on the middle or bight of said apron.

It is intended that the screen, in all cases, will be made the full width of a battery, so as to feed equally under all the stamps, which it is impossible to do with the ordinary forms of ore-feeders. The feed-gage or screw-clamp is so close to the man who feeds the hopper that he can adjust it at any time without loss of time.

It will be noticed that by overlapping the plates of metal which form the apron a series of transverse ridges, $i$, are formed, which tend to make the feed very regular and carry the ore forward surely. These iron plates, forming the apron, have no interstices between them, since they overlap each other, after the manner of the closed slats of a blind, and thus form a corrugated or ridged surface on which the ore travels.

We are aware that an endless common belt operated by a lever moved by the stamp has been used in an automatic ore-feeder, and we do not therefore claim, broadly, such a belt; but What we do claim as new, and desire to secure by Letters Patent, is—

In an ore-feeder, the lever G, to be struck by the descending stamp, the rocking arms $g$, pawls F, ratchets E, and apron D, in combination with the springs $h$ and adjustable clamps H, all constructed, arranged, and operated as set forth.

In witness whereof we have hereunto set our hands.

DAVID J. O'HARRA.
DANIEL FEIT.

Witnesses:
GEO. H. STRONG,
FRANK A. BROOKS.